United States Patent [19]

Bigej

[11] Patent Number: 4,796,318
[45] Date of Patent: Jan. 10, 1989

[54] FISHERMAN'S PLIERS

[76] Inventor: Albert L. Bigej, 24775 Trask River Rd., Tillamook, Oreg. 97141

[21] Appl. No.: 119,692

[22] Filed: Nov. 12, 1987

[51] Int. Cl.$^4$ .................. A01K 69/00; B25F 1/00
[52] U.S. Cl. ................................... 7/106; 7/132
[58] Field of Search ............ 7/106, 125, 132, 133, 7/134

[56] References Cited

U.S. PATENT DOCUMENTS

| | | | |
|---|---|---|---|
| 376,493 | 1/1888 | Vannatter et al. | 7/134 |
| 1,804,149 | 5/1931 | Clemens | 7/134 |
| 2,571,819 | 10/1951 | Boel et al. | 7/106 |
| 2,753,741 | 7/1956 | Riley | 7/106 |
| 3,172,319 | 3/1965 | Stanfield | 7/106 |
| 3,597,775 | 8/1971 | McCosland | 7/106 |
| 4,208,749 | 6/1980 | Hermann | 7/106 |

*Primary Examiner*—Roscoe V. Parker
*Attorney, Agent, or Firm*—Klarquist, Sparkman, Campbell, Leigh & Whinston

[57] ABSTRACT

A pair of fisherman's pliers for connecting a lead fishing weight to a fishing line comprises a pair of pliers with a pair of handles pivotally connected to a pair of elongated and tapered jaws such that the jaws are brought together as the handles are brought together. A blade on the jaws is provided for cutting an elongated piece of lead to the desired length, with a wedge provided for impressing a notch into one end of the elongated piece of lead. The jaws are provided with opposed surfaces for pressing the notch closed around a length of fishing line. Depressions are also provided on the jaws for receiving a spherical piece of lead so that it can be crimped onto a fishing line.

10 Claims, 1 Drawing Sheet

U.S. Patent   Jan. 10, 1989   4,796,318
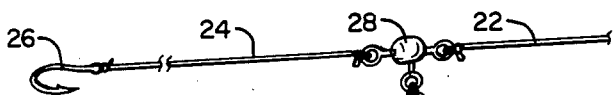
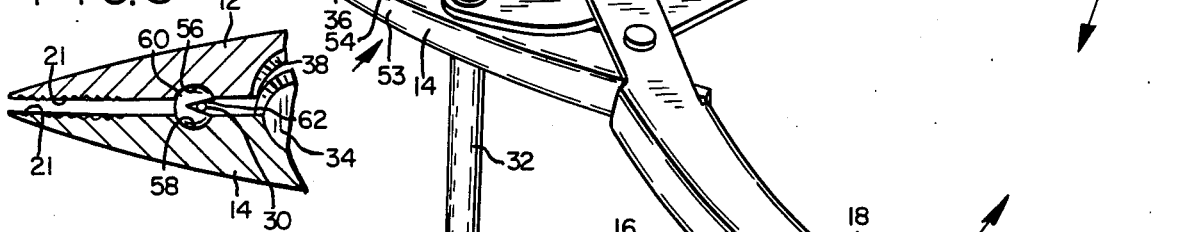
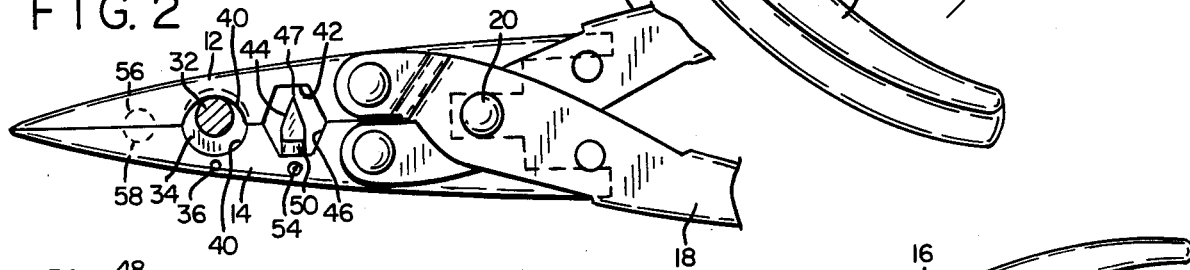
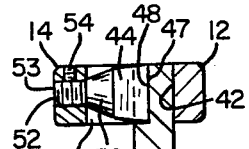
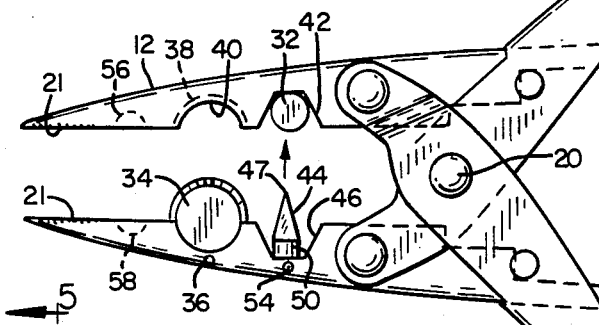
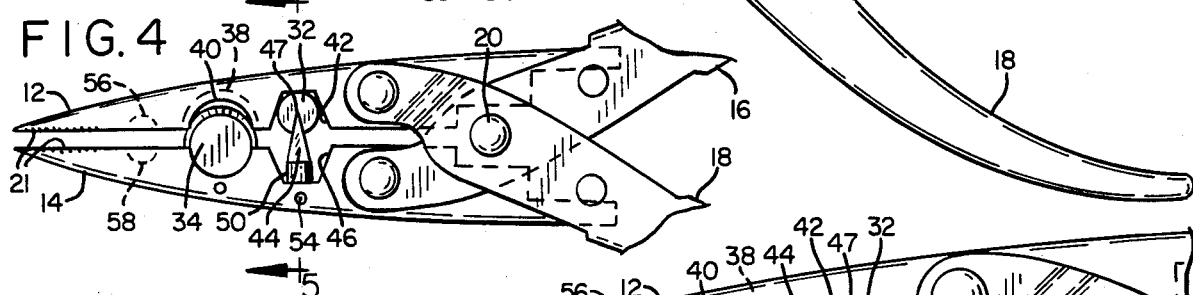
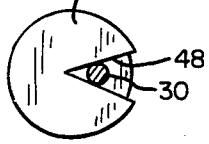
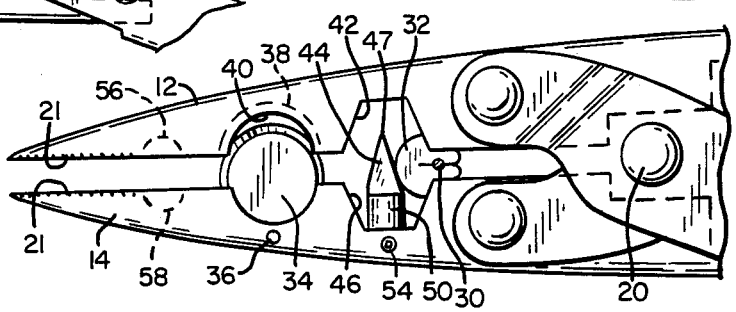

# FISHERMAN'S PLIERS

BACKGROUND OF THE INVENTION

1. Field of the Invention

The present invention generally relates to fishermen's pliers and, in particular, to fishermen's pliers adapted to cut and manipulate lead fishing weights for attachment to fishing line.

2. Description of the Prior Art

In many fishing applications, fishermen use lead weights or "sinkers" which are attached to the fishing line in order to hold the line and the attached bait near the bottom of a river or lake where fish like to congregate. Various sizes and shapes of lead weights may be utilized, depending upon the conditions in the fishing area.

One commonly used form of lead weight commonly used is "split shot." These are spherical balls of lead of various sizes, each containing a notch or slot. Split shot lead can be attached at any desired location on the fishing line by crimping the notch closed around the line to hold the weight in place. A second form of lead weight is commonly called "pencil lead" and is an elongated cylinder of lead. The lead is cut to the desired length to provide the desired amount of weight. Pencil lead has the further advantage that it does not lodge between rocks in most circumstances due to its shape.

Pencil lead may be attached to the fishing line by a variety of methods. The goal of the various method is that, should the pencil lead become wedged between rocks or caught in some other underwater hazard, the fishing line will detach from the lead weight so that the fisherman's bait, hook and other tackle are not lost. By creating a sufficient pull on the line, the line may be pulled from the pencil lead without breaking the line, and the remaining tackle may be retrieved.

One of the methods for attaching pencil lead utilizes a length of surgical tubing which is threaded on the line or secured to a swivel inserted in the fishing line. The lead is of slightly larger diameter than the tubing, which allows the lead to be pulled out if it becomes wedged in the rocks. However, with age and use, the surgical tubing may stretch and allow the lead to slip out under normal fishing conditions.

Another method is to attach the pencil lead to the fishing line by forming an opening such as a slit in the lead and pinching the slit closed about a leader or dropper depending from the line.

SUMMARY OF THE INVENTION

The present invention is directed to a pair of fisherman's pliers for connecting pencil lead and split shot weights to a fishing line. The invention comprises a pair of pliers with a pair of handles pivotally connected to a pair of elongated and tapered jaws such that the jaws are brought together as the handles are brought together. A cutting means is located on the jaws for cutting an elongated piece of lead to the desired length, and a notching means is also located on the jaws for impressing a notch into one end of the elongated piece of lead. A first crimping means on the jaws presses the notch closed around a length of fishing line for holding the weight on the line, and a second crimping means on the jaws receives and crimps a spherical piece of lead to the fishing line.

BRIEF DESCRIPTION OF THE DRAWINGS

FIG. 1 is a perspective view of a fisherman's pliers in accordance with the present invention.

FIG. 2 is a partial top view of the pliers showing the jaws in a closed position.

FIG. 3 is a top view of the pliers showing the jaws in an open position.

FIG. 4 is a partial top view of the pliers showing an elongated piece of lead, being notched.

FIG. 5 is a front elevational view of the pliers taken along lines 5—5 of FIG. 4.

FIG. 6 is a top view of an elongated piece of pencil lead showing the position of the fishing line in a notch formed therein prior to crimping.

FIG. 7 is a partial top view of the pliers showing a piece of pencil lead being crimped.

FIG. 8 is a partial top view of the pliers showing a spherical piece of lead being crimped.

DETAILED DESCRIPTION OF THE PREFERRED EMBODIMENTS

FIG. 1 shows a perspective view of a pair of fisherman's pliers 10 in accordance with the present invention. The pliers 10 include a pair of jaws 12 and 14 pivotally connected to a pair of handles 16 and 18 around pivot pin 20. FIG. 1 shows a pair of compound pliers, although various types of pliers could also be utilized. The jaws 12 and 14 are provided with a plurality of grooves 21 for improved gripping of fishhooks, fish line, etc.

FIG. 1 also shows a generalized method of rigging a fishing line. The primary fishing line 22 is connected to a fishing leader 24 containing a hook 26 by a three-way swivel 28. Another length of fishing leader, a so-called dropper, 30 is also attached to the swivel 28 for attachment of a lead fishing weight, such as the elongated lead weight 32. This manner of rigging the line allows the bait, which is attached to hook 26, to float up off the bottom of the lake or river to attract fish.

The pliers 10 of the present invention attach the elongated lead fishing weight 32 to the dropper 30 in such a way that the dropper 30 may be pulled from the lead 32 should the lead 32 become wedged in the rocks on the bottom or snarled in underwater plants and trees.

Pencil lead is typically sold in either roll form or in sticks of varying lengths. The lead is cut to the desired length for use, depending upon the amount of weight needed for the fishing conditions. In order to cut the lead weight 32, a blade 34 is provided on the pliers 10. In the preferred embodiment, the blade 34 is mounted in jaw 14 and removably secured using a set screw 36. The blade 34 is semicircular in shape and is received by a slot 38 in jaw 12 when the pliers 10 are in a closed position. Slot 38 is positioned in a semicircular depression 40 in jaw 12. The depression 40 retains the lead 32 while it is being cut, as more clearly shown in FIG. 2. The blade 34 may be removed if necessary for replacement or sharpening by loosening the set screw 36.

After the lead 32 has been cut to the desired length, a notch is formed at one end using the pliers 10, as shown in FIGS. 3 and 4. One end of the lead 32 is placed within a first indentation 42 in jaw 12. A pointed wedge 44 is mounted within a second indentation 46 on jaw 14 which aligns with the first indentation 42. When the jaws 12 and 14 are closed by bringing handles 16 and 18 together, the point 47 of the wedge 44 is forced into the elongated piece of lead 32, forming a V-shaped notch 48 in the end of the lead 32, as shown in FIG. 4.

The wedge 44, which is more clearly shown in FIG. 5, contains a shank portion 50 and a threaded portion 52, which is screwed into a threaded hole 53 in jaw 14. A set screw 54 is provided to hold the wedge 44 in place. If desired, the wedge 44 may be removed for sharpening or replacement.

In order to attach the lead weight 32 to the dropper 30, the free end of the dropper 30 is placed within the notch 48 of the lead 32, as shown in FIG. 6. The lead 32 is then placed between the jaws 12 and 14, and pressure is applied to the handles 16 and 18 to close the jaws. As shown in FIG. 7, the jaws 12 and 14 are brought together to force the sides of the notch 48 inward in order to pinch the lead onto dropper 30. Although FIG. 7 shows the lead 32 positioned between the jaws 12 and 14 near the first and second indentations 42 and 46, the lead 32 may be placed at any suitable location between the jaws 12 and 14. However, better leverage is achieved by placing the lead 32 closer to the pivot pin 20. By varying the amount of force which is used to close the notch 48, the fisherman can adjust the amount of tension needed to pull the dropper 30 out of the lead 32.

In some fishing situations, it is also desirable to use split shot fishing weights, which may be easily accommodated using the present invention. As shown in FIG. 8, jaws 12 and 14 near their ends are each provided with a semispherical indentation 56 and 58. The indentations 56 and 58 are positioned across from one another on the jaws 12 and 14 and adapted to seat a split shot lead weight 60. A portion of the dropper 30 is placed within a notch 62 in the split shot 60 and pressure is applied to the handles 16 and 18 to close the jaws 12 and 14 to crimp the notch 62 around the dropper 30.

The elongated needle nose configuration of the jaws 12 and 14 is useful in facilitating grasping of hooks embedded in a fish's jaw in extracting the hook.

Although preferred embodiments of the present invention have been shown, it is obvious that many modifications and variations of the present invention are possible in light of the above teachings. It is therefore to be understood that the present invention may be practiced otherwise than as specifically described.

What is claimed:

1. In combination with a pair of fisherman's pliers wherein a pair of elongated and tapered jaws are pivotally connected to a pair of handles such that the jaws are brought together as the handles are brought together, wherein the improvement comprises:
    cutting means on the jaws for cutting an elongated piece of lead wherein the cutting means comprises blade means in one of the jaws extending toward the other jaw for cutting the lead as the jaws are brought together and lead retaining means in the other jaw for holding the lead as it is cut;
    notching means on the jaws for impressing a notch into the elongated piece of lead;
    first crimping means on the jaws for pressing the notch closed; and
    second crimping means on the jaws for receiving and crimping a spherical piece of lead.

2. The combination of claim 1 wherein the lead retaining means further comprises a slot for receiving a portion of the blade means when the jaws are in a closed position.

3. The combination of claim 1 wherein the notching means comprises:
    lead positioning means in one of the jaws; and
    wedge-shaped member in the other jaw for impressing the notch in the lead when the jaws are brought together.

4. The combination of claim 3 wherein the wedge-shaped member is removable.

5. The combination of claim 1 wherein the second crimping means comprises:
    a spherical indentation in each jaw positioned to seat the spherical lead when the jaws are brought together.

6. A pair of fisherman's pliers for connecting a lead fishing weight to a fishing line, comprising:
    a pair of handles;
    a pair of elongated and tapered jaws pivotally connected to the handles such the jaws are brought together as the handles are brought together;
    cutting means on the jaws for cutting an elongated piece of lead wherein the cutting means comprises blade means in one of the jaws extending toward the other jaw for cutting the lead as the jaws are brought together, and lead retaining means in the other jaw for holding the lead as it is cut;
    notching means on the jaws for impressing a notch into the elongated piece of lead;
    first crimping means on the jaws for pressing the notch closed around a length of fishing line; and
    second crimping means on the jaws for receiving and crimping a spherical piece of lead to the fishing line.

7. The combination of claim 4 wherein the lead retaining means further comprises a slot for receiving a portion of the blade means when the jaws are in a closed position.

8. The combination of claim 6 wherein the notching means comprises:
    lead positioning means in one of the jaws; and
    wedge-shaped member in the other jaw for impressing the notch in the lead when the jaws are brought together.

9. The combination of claim 8 wherein the wedge-shaped member is removable.

10. The combination of claim 6 wherein the second crimping means comprises:
    a spherical indentation in each jaw positioned to seat the spherical lead when the jaws are brought together.

* * * * *

UNITED STATES PATENT AND TRADEMARK OFFICE
CERTIFICATE OF CORRECTION

PATENT NO. : 4,796,318

DATED : January 10, 1989

INVENTOR(S) : Albert L. Bigej

It is certified that error appears in the above-identified patent and that said Letters Patent is hereby corrected as shown below:

Claim 7, column 4, line 43, "claim 4" should be --claim 6--.

Signed and Sealed this

Twelfth Day of December, 1989

Attest:

JEFFREY M. SAMUELS

*Attesting Officer*     *Acting Commissioner of Patents and Trademarks*